March 3, 1964 L. EHRMAN 3,123,797

DISTANCE MEASURING DEVICE

Filed Dec. 6, 1960 2 Sheets-Sheet 1

INVENTOR:
LEONARD EHRMAN
BY
Edward L. Amonette
AGENT

INVENTOR:
LEONARD EHRMAN
BY
Edward L. Amonette
AGENT

United States Patent Office 3,123,797

Patented Mar. 3, 1964

3,123,797

DISTANCE MEASURING DEVICE

Leonard Ehrman, Albuquerque, N. Mex.
(83 Bertwell Road, Lexington 73, Mass.)

Filed Dec. 6, 1960, Ser. No. 75,069
3 Claims. (Cl. 340—1)

The invention described herein may be manufactured and used by or for the Government of the United States of America for governmental purposes without the payment of any royalty thereon or therefor.

This invention relates generally to distance-measuring devices, and more particularly to devices for measuring relatively short distances by means of radiated ultrasonic energy.

There are many uses for the present invention, including determining the altitude of a helicopter above a ground or water surface, determining the degree of emptiness of a storage tank containing liquids or solids, measuring the height of water waves relative to a fixed land point, and measuring the altitude of the hull of a hydrofoil craft above the water surface. These applications all require a device which is compact and reliable, which has short time lags and which avoids physical contact with the surface from which the distance is being measured.

In the case of a hydrofoil craft which cruises with its hull above the water, held up by streamlined submerged wings, there have been many prior attempts to design a successful altimeter. One such attempt utilized a hinged ski which rode the surface of the water and transmitted altitude information to an indicator by means of a mechanical linkage between the ski and the hull of the craft. This device had much inherent time lag due to mechanical inertia, and was easily damaged by debris floating on the surface of the water. Another device included a strut which extended from the hull into the water and carried a series of probes along its length. The degree of immersion of the strut in the water determined how many of the probes were shorted out by the water, resulting in a suitable electrical indication. Again the device was easily damaged by debris, and in addition there was considerable hydrodynamic drag. In general, altitude measuring devices utilizing capacitive and resistive effects are not suitable for hydrofoil craft because of humidity and water surface effects which make it difficult to maintain suitable accuracy.

I have invented a distance-measuring device which makes no physical contact with the surface from which the distance is measured, which has no substantial error due to time lag, which is not damaged by floating debris when it is used in connection with a hydrofoil craft, and which is extremely compact and reliable. Briefly, my invention utilizes pulses of alternating ultrasonic energy which are transmitted to a reflective surface from which it is desirable to measure a distance, and which are received after reflection, the total transmission time being a measure of the distance. The device includes suitable electrical circuitry for generating the ultrasonic pulses and for determining the time difference between the transmission of a given pulse and its reception after reflection. A better understanding of my invention may be had by reading the more detailed description to follow, in conjunction with the attached drawing in which:

Figure 1:
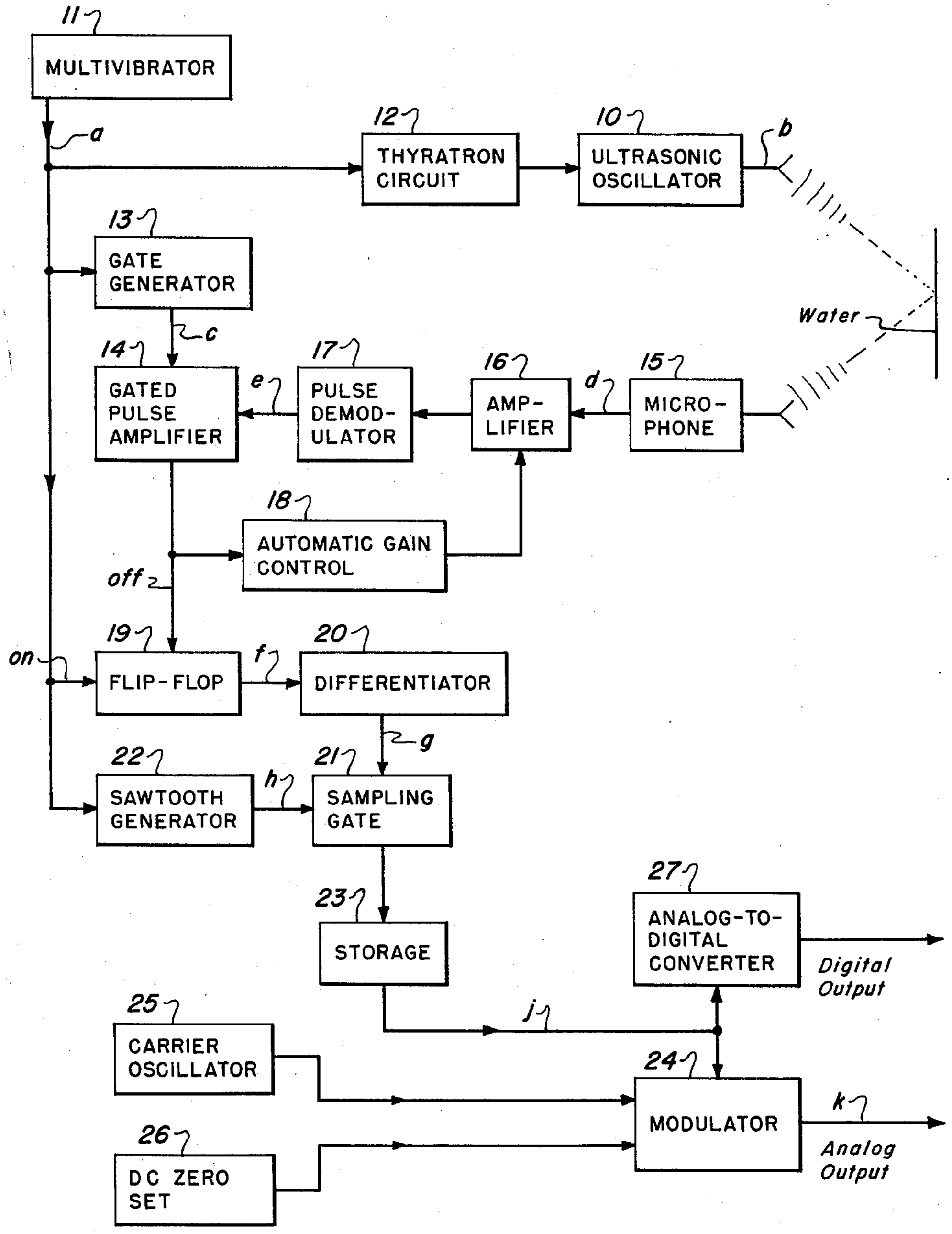
FIG. 1 is a block diagram of a preferred embodiment of my invention.

Referring now to the drawing, a preferred embodiment of my invention will be described with particular reference to its use as an altimeter for a hydrofoil craft, although it will be apparent that applications previously mentioned and others are feasible without departing from the sphere and scope of the invention as claimed. Block diagrams only are shown, since circuits represented by the blocks are well-known to those skilled in the art.

For measuring short distances by means of a radiating device it is best to use sonic or ultrasonic energy rather than electromagnetic energy, in order that the slow velocity of propagation (approximately the velocity of sound transmission) can be taken advantage of to yield easily handled time differences between transmission and reception of a pulse. The slight variations in sound velocity are normally negligible in an application such as this. For these reasons ultrasonic oscillator 10 is used as the energy transmitter, mounted on the hull of the hydrofoil craft and oriented to transmit ultrasonic energy toward the water surface. Free-running multivibrator 11 is designed to produce a relatively narrow voltage pulse at a repetition rate depending upon the distance to be measured, but slow enough to allow return of a reflected pulse before another multivibrator pulse is generated. For ranges of up to 8–10 feet a pulse rate of approximately 60 c.p.s. was chosen.

The multivibrator pulses *a* are used to trigger thyratron circuit 12, yielding a powerful pulse which is applied to windings around a magnetostrictive body in the ultrasonic oscillator 10. Due to the principle of magnetostriction, the application of the magnetic field produced by current flowing through the windings creates a pulse *b* of alternating ultrasonic energy which travels to the reflective surface, in this case, water.

Multivibrator pulses *a* are applied also to gate generator 13 which produces a narrow negative inhibiting pulse followed by a broader positive gate pulse, both shown as waveform *c*. The gate portion of the waveform allows gated pulse amplifier 14 to amplify an applied input voltage. Reflected pulses of ultrasonic energy are received by microphone 15 which has an ultrasonic response band and is mounted on the craft hull, and conducted in the form *d* to amplifier 16. The amplified pulses are demodulated by pulse demodulator 17 and the demodulated pulses *e* are applied to the input of gated pulse amplifier 14.

It is seen that if any reflected pulses arrive at the gated pulse amplifier while the inhibiting portion of waveform *c* is applied to the amplifier, the amplifier will not accept the input and it will have no output. This is to guard against the reception of portions of the transmitted pulse by microphone 15 and the treatment of such a received pulse as a reflected pulse. If this were to happen a false indication of altitude would result.

When the device is used in connection with a hydrofoil craft it is found that the signal level of reflected pulses varies with the altitude and with the angle of the craft with respect to the water surface. For this reason automatic gain control circuitry 18 is connected between gated pulse amplifier 14 and amplifier 16 to maintain a relatively constant output from amplifier 16. Obviously, automatic gain control is not required in all applications.

Multivibrator pulses *a* also are used to turn on flip-flop 19, while the gated reflected pulses from gated pulse amplifier 14 turn the flip-flop off. The result is the waveform *f*, the negative-going, or off, output of which is differentiated by differentiator 20 and applied to sampling gate 21. The differentiator includes rectifying circuitry to make it sensitive only to negative-going pulses. The purpose of the flip-flop 19 is to prevent multiple reflected pulses from passing through the circuitry and giving false indications of altitude. It is seen that only the first reflected pulse passed by the gated pulse amplifier 14 can create an output from differentiator 20, since the flip-flop will not have a negative-going output until it is again turned on or reset by multivibrator 11 and then turned off by a following reflected pulse.

Another function of multivibrator 11 is to trigger sawtooth generator 22, producing the sawtooth waveform *h* which has the same period as waveform *a* and which rises linearly with time during each period. Waveform *h* is applied to bi-directional sampling gate 21 but is not passed by the gate except during application of waveform *g* from differentiator 20. Waveform *g* is seen to be a time indication of the receipt of a reflected pulse and when applied to sampling gate 21 allows the gate to pass a sample of the sawtooth waveform *h* to storage 23. The process is one of conversion from the time location of pulse *g* as an indication of receipt of a reflected pulse, to the voltage amplitude transferred to storage as the same indication. The storage may be nothing more than a capacitor which assumes a charge proportionate to the sawtooth amplitude at the time of occurrence of pulse *g*. Sampling gate 21 is bi-directional to allow the storage to charge or discharge through the gate according to the sawtooth amplitude relative to the previously stored voltage.

Waveform *j* indicates the output of storage 23 which is applied to modulator 24. The modulator may be two full wave crystal bridges connected to be phase sensitive. Carrier oscillator 25 applies to the modulator an alternating carrier voltage which may have a frequency around 400 c.p.s. D.C. zero set 26 adjusts the zero of the modulation corresponding to a certain distance or altitude. The application of varying D.C. waveform *j* to modulator 24 results in the modulated waveform *k*, an analog signal which is seen to vary in amplitude proportional to the applied D.C. voltage, which in turn is proportional to the elapsed time between a transmitted pulse and the corresponding reflected pulse, in turn proportional to the distance being measured.

Figure 2:
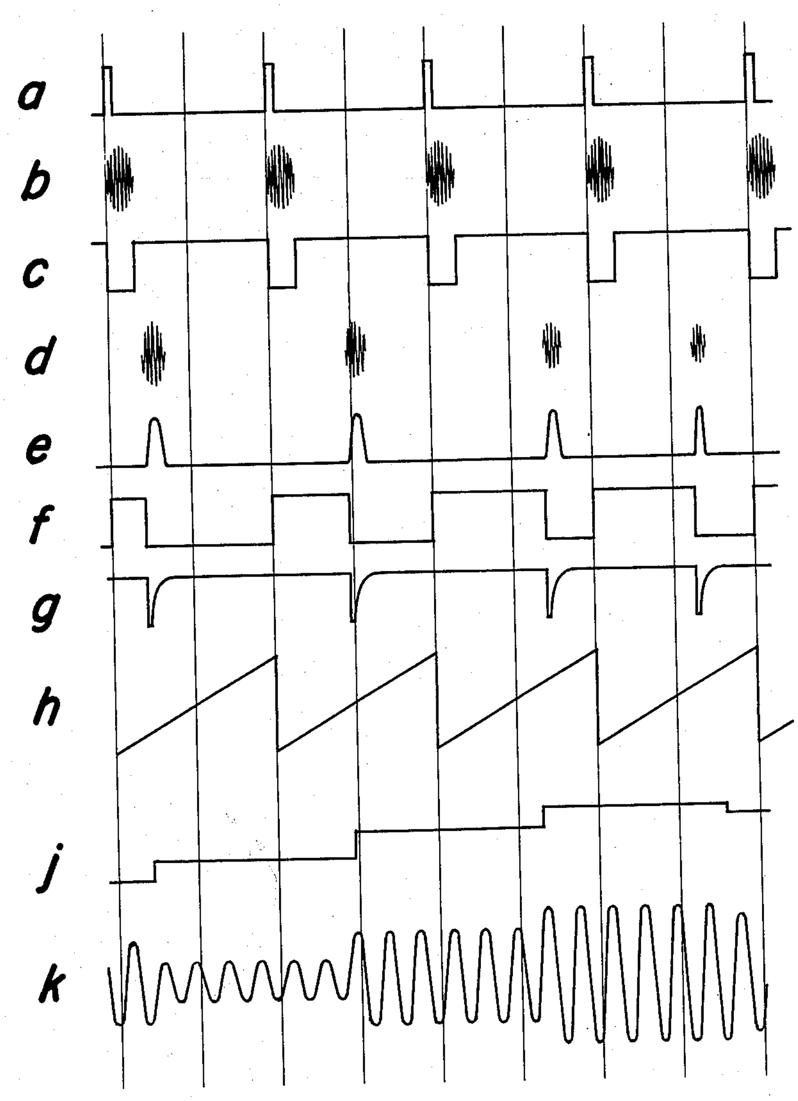
FIG. 2 shows tyical voltage waveforms plotted against increasing time from left to right, observable at selected locations within the circuitry of the device as indicated on the block diagram.

Although not shown in FIG. 2, the application of waveform *j* also varies the phase of the carrier, due to the inherent action of modulator 24, well known to those skilled in the art. Thus, increase or decrease in distance or altitude from that corresponding to the D.C. zero setting is indicated by a change in the phase of waveform *k*. This waveform may be applied to indicating or control circuitry used, for instance, to control the altitude of a hydrofoil craft by controlling the angle of attack of the submerged wings.

In some cases, for instance where the altitude data is used by a digital computer, it is desirable that the output be in digital rather than analog form. This is accomplished by optional analog-to-digital converter 27 which converts the output of storage 23 from a signal whose amplitude is proportional to altitude to one consisting of coded pulses whose number and sequence indicate altitude. A D.C. zero set (not shown) similar to 26 may be used with converter 27.

In FIG. 2 the succession of reflected pulses *d* shows a condition of increasing altitude from the first through the third pulses, counting from the left, and decreasing altitude from the third to the fourth pulse. The end effect on waveform *k* is a decrease in amplitude when the first reflected pulse is received; then a stepped increase in amplitude through the reception of the third pulse; followed by a slight decrease in amplitude corresponding to the decrease in altitude represented by the fourth pulse. Due to the action of automatic gain control 18, pulses *e* have a constant amplitude in spite of the variations in amplitude of pulses *d*.

In the preferred embodiment which has been described a magnetostrictive transducer having a natural frequency between 30 and 40 kilocycles per second is used as the ultra-sonic oscillator 10. This frequency was chosen as a compromise between a desirable high frequency to avoid interference from local sonic noise, and a desirable low frequency to avoid the attenuation attendant with high frequency operation. Other reasonable frequencies may be chosen, however. Although the magnetostrictive transducer is described in connection with the preferred embodiment, it is quite feasible to use other types of ultrasonic transmitters such as high-frequency loud speakers, piezo-electric transducers and the like. The ultra-sonic microphone may be a crystal or some other type of microphone or, if high sensitivity is not required, a magnetostrictive device may be used.

I claim as my invention:

1. For use in determining the altitude of the hull of a hydrofoil craft above the water surface, an ultrasonic altimeter mounted on the craft and comprising:

a magnetostrictive oscillator oriented to transmit ultrasonic energy from the craft toward the water;

a free-running multivibrator having a pulse output whose pulse width is brief compared to the period and whose pulse repetition rate is slow relative to the oscillator frequency;

thyratron circuitry triggered by the multivibrator and coupled to the magnetostrictive oscillator thereby producing pulses of alternating ultrasonic energy in response to the multivibrator pulses;

a microphone having an ultrasonic frequency response, oriented to receive pulses of ultrasonic energy reflected from the water;

an amplifier with automatic gain control for amplifying the microphone output and for maintaining a constant output signal level regardless of the strength of the reflected pulses;

a pulse demodulator for demodulating the amplifier output;

a gated pulse amplifier controlled by a gate generator to be responsive to demodulated pulses only during the time period between successive multivibrator pulses;

a flip-flop which is connected to be turned on by a pulse from the multivibrator and to be turned off by a gated demodulated pulse passed by the gated pulse amplifier;

means for differentiating the off output of the flip-flop;

a sawtooth waveform generator whose waveform period is equal to that of the multivibrator and whose waveform amplitude is linear with time;

means for storing a voltage level;

a sampling gate controlled by the differentiated off output of the flip-flop and connected to transfer a sample of the sawtooth waveform to the storage means;

a carrier oscillator;

and means responsive to the stored voltage sample for controlling the amplitude of the carrier to be proportional to the magnitude of said sample and hence proportional to the altitude, and for controlling the phase sense of the carrier according to whether the voltage sample is greater or less than a predetermined value, and hence according to whether the altitude is greater or less than a corresponding predetermined value.

2. The device of claim 1 wherein the oscillator frequency is between 30 and 40 kilocycles per second and the pulse repetition rate is approximately 60 cycles per second.

3. For use in determining the altitude of the hull of a hydrofoil craft above the water surface, an ultrasonic altimeter mounted on the craft and comprising:

a magnetostrictive oscillator oriented to transmit ultrasonic energy from the craft toward the water;

a free-runing multivibrator having a pulse output whose pulse width is brief compared to the period and whose pulse repetition rate is slow relative to the oscillator frequency;

thyratron circuitry triggered by the multivibrator and coupled to the magnetostrictive oscillator thereby producing pulses of alternating ultrasonic energy in response to the multivibrator pulses;

a microphone having an ultrasonic frequency response, oriented to receive pulses of ultrasonic energy reflected from the water;

an amplifier with automatic gain control for amplifying the microphone output and for maintaining a constant output signal level regardless of the strength of the reflected pulses;

a pulse demodulator for demodulating the amplifier output;

a gated pulse amplifier controlled by a gate generator to be responsive to demodulated pulses only during the time period between successive multivibrator pulses;

a flip-flop which is connected to be turned on by a pulse from the multivibrator and to be turned off by a gated demodulated pulse passed by the gated pulse amplifier;

means for differentiating the off output of the flip-flop;

a sawtooth waveform generator whose waveform period is equal to that of the multivibrator and whose waveform amplitude is linear with time;

means for storing a voltage level;

a sampling gate controlled by the differentiation off output of the flip-flop and connected to transfer a sample of the sawtooth waveform to the storage means;

and an analog-to-digital converter responsive to the stored voltage level and yielding a digital signal indicative of the altitude.

References Cited in the file of this patent

UNITED STATES PATENTS

| | | |
|---|---|---|
| 2,422,698 | Miller | June 24, 1947 |
| 2,500,638 | Krauth | Mar. 14, 1950 |
| 2,574,596 | Slaymaker | Nov. 13, 1951 |
| 2,599,586 | Ross | June 10, 1952 |
| 2,743,429 | Erdman et al. | Apr. 24, 1956 |
| 3,006,184 | Goldman | Oct. 31, 1961 |
| 3,017,832 | MacDonald | Jan. 23, 1962 |
| 3,021,807 | Stedman | Feb. 20, 1962 |